Feb. 6, 1968   A. J. BERGER   3,368,048
TIME CONTROLLED TEMPERATURE REGULATOR
Original Filed Jan. 27, 1964   5 Sheets-Sheet 1

INVENTOR.
ARTHUR J. BERGER

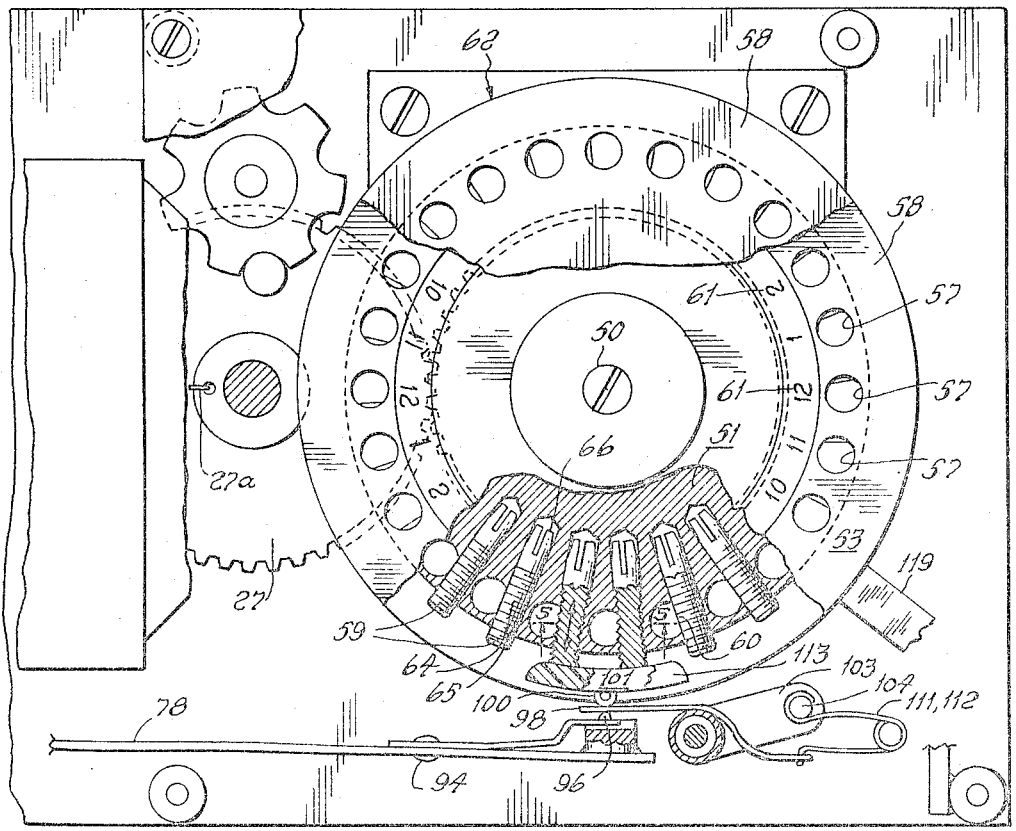

Feb. 6, 1968 A. J. BERGER 3,368,048
TIME CONTROLLED TEMPERATURE REGULATOR
Original Filed Jan. 27, 1964 5 Sheets-Sheet 3
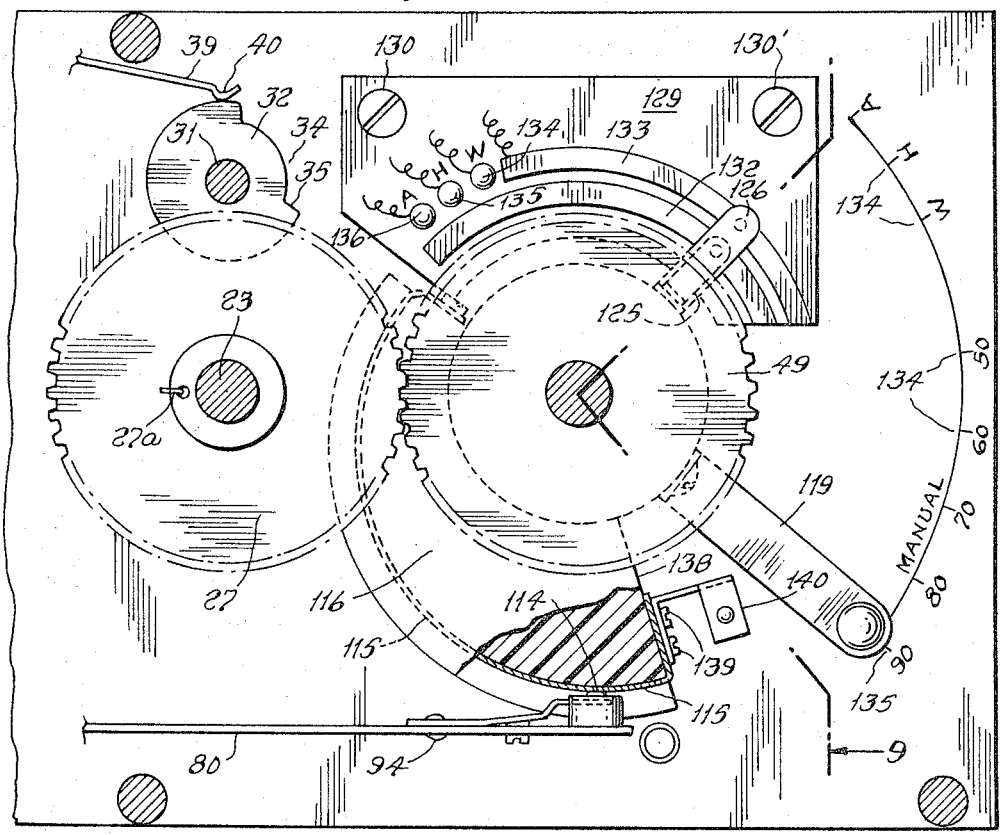
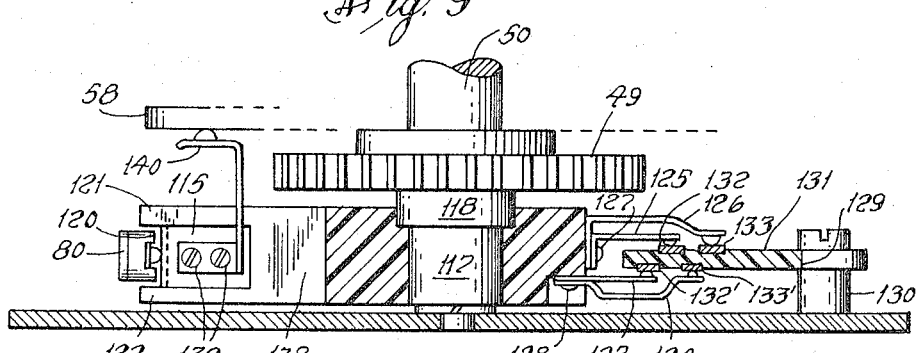
INVENTOR.
ARTHUR J. BERGER Feb. 6, 1968 A. J. BERGER 3,368,048
TIME CONTROLLED TEMPERATURE REGULATOR
Original Filed Jan. 27, 1964 5 Sheets-Sheet 4
Fig. 10
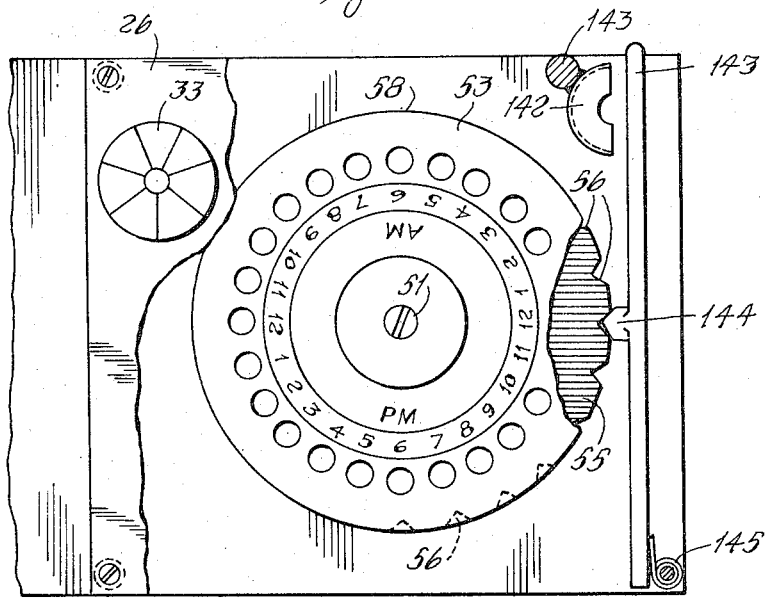
Fig. 11
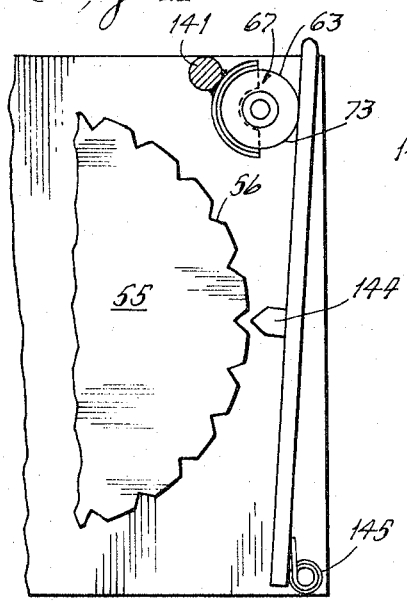
Fig. 12
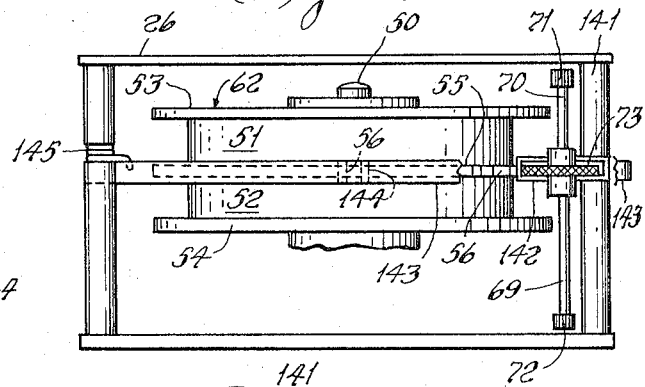
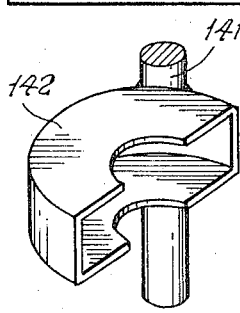
Fig. 13
INVENTOR.
ARTHUR J. BERGER

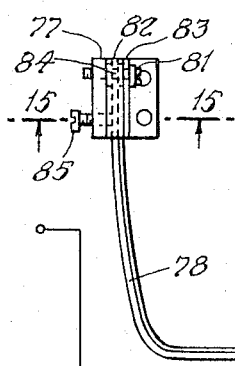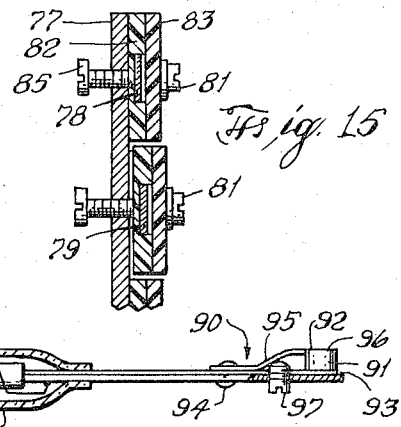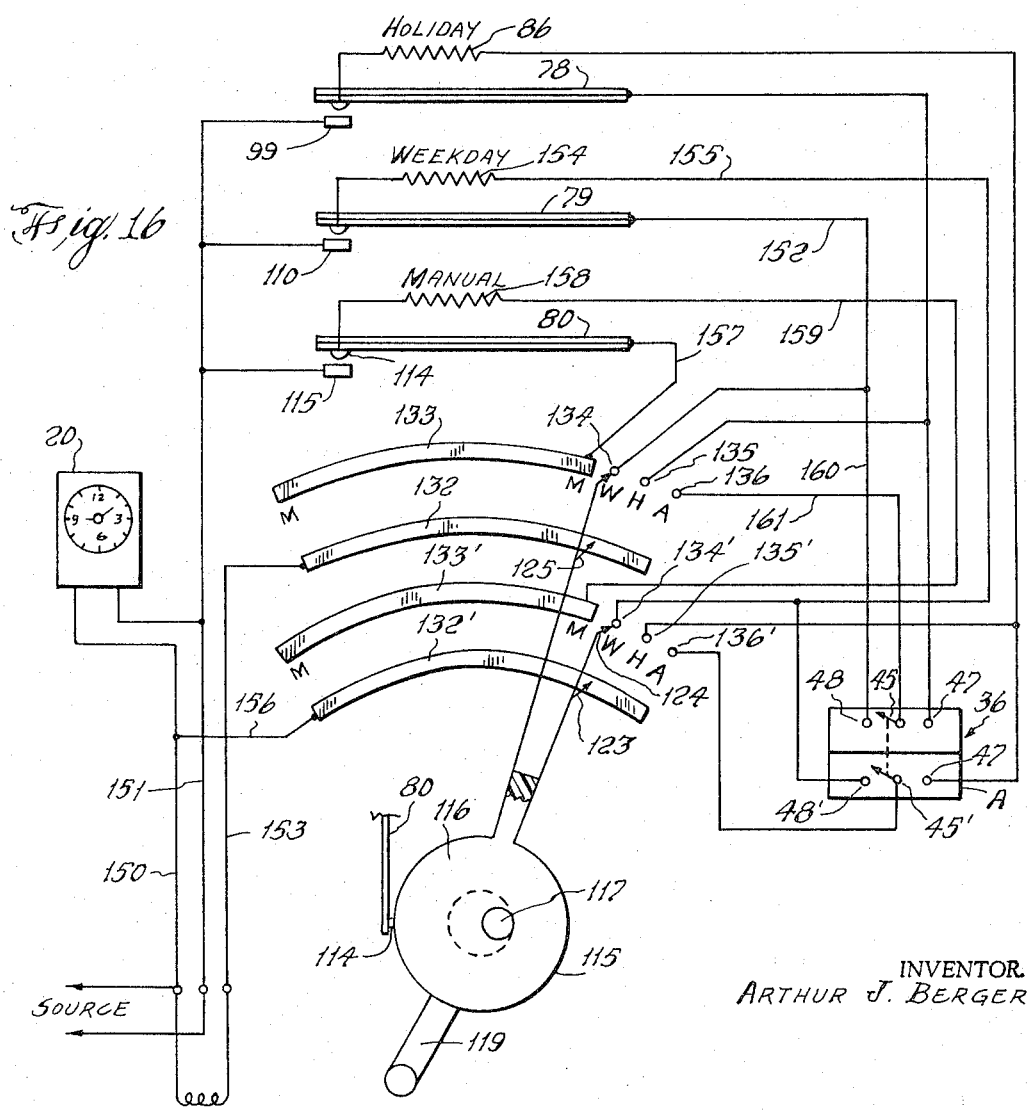

United States Patent Office 3,368,048
Patented Feb. 6, 1968

3,368,048
TIME CONTROLLED TEMPERATURE
REGULATOR
Arthur J. Berger, 123 N. Highland Place,
Croton-on-Hudson, N.Y. 10520
Original application Jan. 27, 1964, Ser. No. 340,183, now
Patent No. 3,264,897, dated Aug. 9, 1966. Divided and
this application Oct. 18, 1965, Ser. No. 516,805
10 Claims. (Cl. 200—136.3)

ABSTRACT OF THE DISCLOSURE

The adjustable temperature control device includes a vertically stacked arrangement of peripherally adjustable cams which are coupled to rotate with an electric clock-motor. A set of temperature responsive bimetal members are supported with their operative ends proximate the periphery of the stacked cams so as to move toward and away therefrom. A dielectric shoe is urged against each cam by a metallic spring contact which is disposed intermediate the operative end of the bimetal member and the cam surface. The operative end of the bimetal member is provided with a contact element which, in conjunction with the metal spring comprises a set of contacts whose closure is dependent on the environmental temperature. A selector switch operated by a day or interval timer selects and places in the circuit a utilization device, such as a heater or cooler with the selected set of contacts associated with the cams. Thus, the environmental temperature is controlled in a preset manner by said cams and switch.

This application is a division of an application, Ser. No. 340,183, filed on Jan. 27, 1964 and now Patent No. 3,264,897, issued Aug. 9, 1966.

This invention relates to the thermostatic control for a temperature regulating system and more particularly to the exact control of temperature regulation over small intervals of time and with respect to the day of the week. The invention further relates to a device for the intimate control of an environmental change which may be programmed over extended periods of time and is especially adaptable to electrically-controlled mechanisms, as for example, the typical home or commercial heating or refrigerating system.

Present heating systems are controlled through the use of what are commonly known as "clock thermostats." These thermostats include a temperature adjustable sensitive switch element mechanism coupled with a clock. Additionally, in the more complex and expensive controls an additional structure is included to permit twice in each 24-hour period an automatic variation in the temperature. Generally this arrangement is such that the heating system will maintain a lower temperature at night and a higher room temperature during the day. This form of contol is inherently limited in that only two temperatures can be selected. Even more obvious is the fact that these present systems are cycled on a 24-hour basis which in effect means that there is no means for accounting or considering the differences in activities of persons during a given day, or from day to day.

As a simple illustration, consider a typical period in which the activities of most people are repetitive. Such a period most logically is a week which includes basically two types of days in which our activities are varied. During work days we follow one particular schedule, and on weekends still another. It would, therefore, at the least, be desirable to have our heater supply temperatures and cycling difference on these days in order to conform with our activities. Further, if the temperature could be controlled on an hourly basis, the house temperature could be made to follow even more closely these requirements. One instance being a typical week day when the temperature should be increased some time shortly before rising, maintained at such a temperature until the members of the household have been sufficiently active (e.g. after breakfast) and then lowered somewhat. If everyone has left the house by a certain time, then the temperature can be lowered further and not raised again until the house is reoccupied; then later, in the evening, when sedentary occupations prevail, the temperature can be raised slightly, then again lowered at bedtime. Since most households follow a closely timed repetitive schedule during most of the year, it is quite practical to also have the house temperature vary in accordance therewith and an hourly control has been found quite satisfactory.

Clearly such a device would enhance our personal comfort while affording monetary savings and a more healthful environment.

Accordingly, it is an object of this invention to provide a simple, efficient, automatic, inexpensive and accurate mechanism for the control of an environmental factor, such as temperature, which is capable of being adjustable for relatively short time increments.

Another object is to provide an automatic thermostatic controller capable of separate adjustment for a standard 24-hour period and for a weekend or holiday cycle, and operable to cycle for an entire weekly period.

A further object of this invention is to provide an automatic clock thermostat which is capable of at least a multiplicity of separately selectable cycles, namely a completely automatic operation where different temperature variations are employed depending on the particular day, such as a weekday operation, a weekend or holiday operation and a manual operation.

Other objects and advantages will be apparent from the following description of an embodiment of the invention and the novel features thereof will be particularly pointed out hereinafter in connection with the appended claims.

In the accompanying drawings:

FIGURE 4 is a cross-section taken approximately along 4—4 of FIGURE 2, with certain portions thereof broken away;

FIGURE 5 is a section taken approximately along line 5—5 of FIGURE 4 with the adjusting key in a position for adjusting the upper cam;

FIGURE 6 is a similar section except with the key in position to adjust the lower cam;

FIGURE 7 is a perspective view of the adjusting key;

FIGURE 8 is a section taken approximately along 8—8 of FIGURE 2;

FIGURE 9 is a section taken approximately along 9—9 of FIGURE 8;

FIGURE 10 is a plan elevation partially in section and portions broken away of the cam and detent mechanism with the adjusting key removed;

FIGURE 11 is an elevation similar to that of FIGURE 10 except with the adjusting key in the stored position;

FIGURE 12 is a side elevation of the portion of the embodiment shown in FIGURE 11;

FIGURE 13 is a perspective view of the adjusting key receptacle;

FIGURE 14 is a cross-section view of the bimetal sensing arm;

FIGURE 15 is a cross-section taken approximately along 15—15 of FIGURE 14; and

FIGURE 16 is a schematic wiring diagram of the circuitry.

Figure 1:
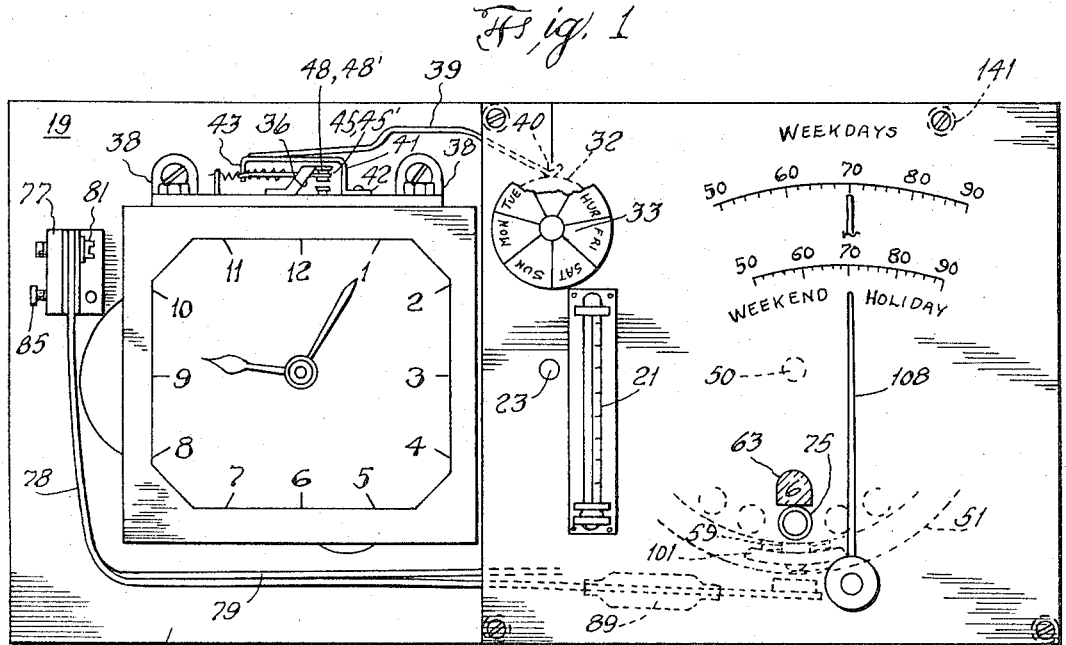
FIGURE 1 is a top plan view of an embodiment made in accordance with the principle of this invention.

In the embodiment of the invention illustrated in FIGURE 1, a clock motor (not shown in detail) supported by posts carried by the base 19 in turn supports and rotates the arms of clock 20. Such motors, as well as their gear trains are well known in the electric clock art and require no further explanation. Control circuits and clocks are usually low voltage devices which affords a savings in wiring, reduces any shock hazard and the need for heavy duty switching devices. A transformer generally located at the fuse panel supplies power for both the clock motor and the control mechanism in the voltage range of 20–30 volts. The wiring to the motor and other circuits has been deleted since this is a standard and well known circuit. The face of the clock is also provided with a thermometer 21 which indicates the surrounding room temperature. The output gear 22 (FIG. 2) of the clock motor rotates shaft 23 which is supported in bearings 24 and 25 carried by upper plate 26 and base 19 and in turn at its lower end portion carries coupling gear 27. Although the gear 27 is carried by the shaft 23 it is free to rotate independently thereof except by being coupled to the shaft through a wraparound spring clutch 27a. One end of the spring is affixed to boss 27b which is securely fastened to the shaft 23 with a portion passing downwardly through the boss and the gear and wrapped around the shaft below the gear. The opposite end of the spring is wound about the shaft so that the gear 27 maybe freely rotated in the counter-clockwise direction since the spring unwinds about the shaft. Should the shaft be rotated clockwise, the spring will be caused to tighten about the shaft and resist rotation in such direction. Clearly this clutch arrangement permits the setting or positioning of the shaft at any selected point as opposed to the detent type of clutches where only discrete positions are possible. This arrangement is best shown in FIGURE 4. Coupling gear 27 is provided with an upwardly extending cylindrical nipple 28. Since the shaft 23 is made to rotate completely once per day, the nipple will engage and turn notched seven star wheel or gear 29, one-seventh of a revolution once every day. The semi-circular notches 30 are complimentary with the periphery of nipple 28 and so are positively driven with little or no play. The notched gear is affixed to shaft 31 likewise having bearings in the upper plate cover and the base and rotatable therein. This cam shaft 31 carries, for rotation therewith a day cam 32 (FIGURE 8) disposed between the notched gear 29 and the base 19 and below the coupling gear 27 and a day indicator 33 (see FIGURE 1) whose face is marked with the days of the week and which is visible through the upper cover plate. For this purpose the cover plate 26 can be provided with a transparent portion aligned therewith and with the clock face and thermometer. The cam and its indicator rotate together although one may be manually adjusted with respect to the other. The cam itself is best illustrated in FIGURE 8, is peripherally provided with a cutaway portion 34 having relatively steep edges 35. The cutaway portion is aligned with the weekend (Saturday and Sunday) markings of the indicator 33.

Referring now back to FIGURE 1 a double pole, double throw snap-action spring biased switch 36 is carried on an electrically insulating block 37 which is supported by angle braces 38 from base 19. The actuator cam follower arm 39 of the switch is biased against the peripheral surface of the cam. A U-shaped member 41 fastened on one end 42 of its arm to the block 37, is of a spring type metal such as beryllium copper or spring steel so that after a deflecting force is removed, it will return to its original position. Coupled at the midpoint of the other arm 43 is a contact carrying member 44 with electrical contacts 45 and 45' carried at its opposite end and biased by spring 46 so as to force its contacts into engagement with fixed contacts 47 and 47' when the follower arm is fully depressed or engaging the low cutaway portion 34 of the day cam 32. This spring 46 is tied to the contact member 44 at some point between its ends so as to form a deflectable pivot point and the spring is fastened rigidly at its opposite end to block 37 and electrically insulated therefrom. Under these conditions the spring effectively biases the actuator arm follower 40 against the cam and the contacts 45, 47 and 45' and 47' into engagement. When, however, the follower arm is raised by engaging the raised portion of the cam the coupled end of contact member 44 is forced in the direction of block 37 and the contacts 45, 45' are lifted to engage contacts 48 and 48' since the member is pivoted between its ends. It should be noted that the primed contacts are electrically insulated from the unprimed contacts and that all the contacts are separately electrically connected to external circuits by wiring not shown but schematically indicated in FIGURE 16.

Summarizing the overall operation of the previous described components, it is clear that as the synchronous motor of the clock drives its gear train to turn the clock hands, it also rotates a coupling gear 27 and shaft 23. Coupled thereto through another shaft and gear is a cam 32 which is rotated at a fixed rate of one revolution per day. The cam surface by way follower arm 39 operates double pole-double throw snap switch 36 so that for that portion of the cam surface corresponding to the weekdays the contacts are in one position and for the weekend days they are in the other position.

Coupling gear 27 in addition to rotating the day cam 32 also meshes with gear 49 which is rigidly affixed to rotable shaft 50 and rotates the same at a speed of one revolution per day. Disposed above the gear 49, rotatable with and mounted on the shaft 50 are a pair of metallic adjustable periphery cams 51 and 52. The two cams may be formed on a unitary member if desired as illustrated or of two separate circular plate cam elements each having a recessed annular groove in the peripheral edge and joined together in face to face abutting relation. The outerfaces 53 and 54 of the adjustable cam member extend radially outwardly beyond the operating cam surfaces of 51 and 52 so as to effectively form therebetween an annular groove. The cam surfaces are separated by a radial flange 55 which is similar to the outerfaces except it is provided with plurality of axial notches 56 in its outer edge. The cam member is provided with 24 axially directed apertures 57 as best illustrated in FIGURE 4 extending therethrough from face to face. The apertures are arranged in circular fashion about the central shaft 50 and inwardly of the outer flanges 58 formed by the extension of the outerfaces. They are equally spaced from one another so as to correspond to hourly differentials as the cam member is rotated. Twenty-four inwardly (from the cam surface) and radially directed apertures 59 are provided in each cam. These radial apertures are disposed so that each just slightly overlaps only one corresponding axial aperture 57 as at 60. Each pair of radial and axial apertures are indexed with an hour of the day 61 on the uppermost surface 62 of the cam member which is visible through transparent window 63 in the cover 26 so that it is immediately discernable which apertures are proximate said window. Disposed within each of the radial apertures 59 is a cam adjusting member 64 having a rear thread surface 65 and provided with lengthwise notches 66 at the opposite end. The adjusting member 64 is frictionally held in the aperture with the notched portion contributing thereto and permitting ease of entry therein although the member is free to move into and out of the aperture under force, it will remain fixed in position once it is set. When the adjusting member is fully in the aperture a substantial portion of the threaded part thereof extends inwardly past axial aperture 57 so as to permit a wide latitude of settings.

Adjustment or setting of members 64 is accomplished by adjusting key 67 (see FIGURES 5, 6 and 7) which comprises a shaft portion 68, a pair of oppositely disposed ends 69 and 70 each carrying on the shaft identical cylindrical tool members 71, 72 having lengthwise serrations or grooves mated for engagement with the threads of adjusting member 64. Between the ends thereof but closed to the tool 71 and carried rigidly on the shaft is a knurled nut element 73 having a pair of guide bosses 74 extending axially outwardly thereof. Setting of the members 64 is easily done by inserting the key 67 through the bushing 75, opening 76 in the cover 26 with the tool 72 down engaging the member 64 of the lower cam 52. The guide boss 74 as well as the key are centered by the bushing 75 and it also sets the proper insertion distance as shown in FIGURE 6. After one of the members has been set, the key is removed and the other end inserted to engage a member 64 in the upper cam as per FIGURE 5. This method of adjustment prevents the adjustment of one cam from affecting the adjustment of the second cam and visa-versa. In order to adjust each cam setting, it is necessary to rotate the cams either in unison or individually so that they are aligned with the bushing 75. For this purpose the spring clutch 27a previously described comes into play by permitting clockwise rotation of the cams for alignment of the proper axial aperture 57 in setting the individual temperature without disturbing or affecting the clock. Additionally, this spring 27a allows for synchronous adjustment of the cams with the clock. The above use of a key does not preclude operation where more than two stacked cams are employed since by allowing the heads 71 and 72 to be movable along the shaft portion 68 any single one of a plurality of cams may be individually set.

Figure 2:
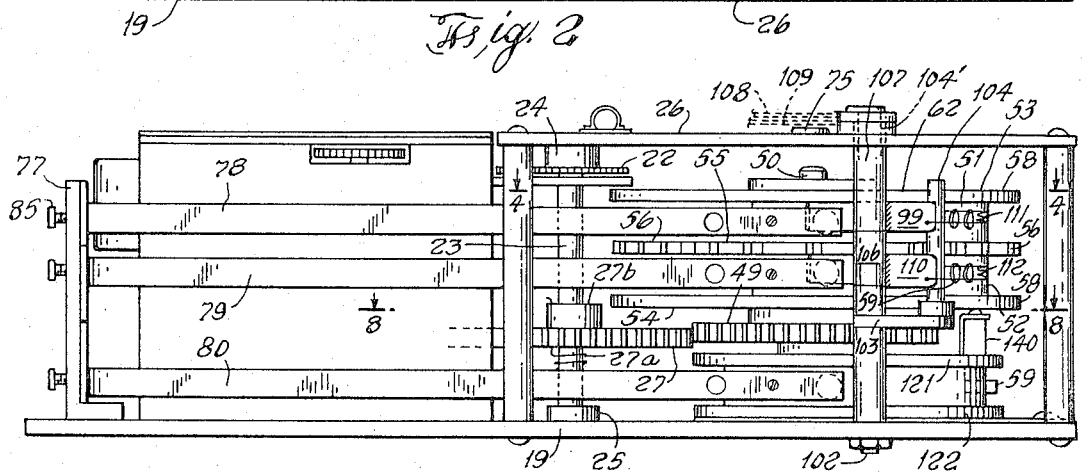
FIGURE 2 is a front elevation of the embodiment of FIGURE 1 with the cover removed.
Figure 3:
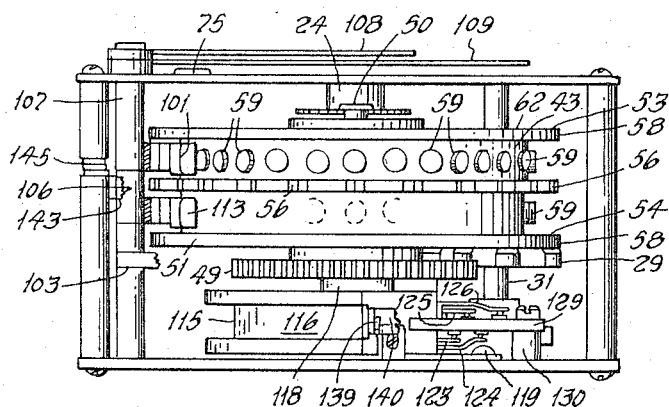
FIGURE 3 is an end elevation of the embodiment with the cover removed.

Referring now to FIGURES 1 and 2, wherein there is illustrated an L-shaped bracket 77 with its shorter leg affixed to base plate 19 and supporting laterally therefrom three generally L-shaped bimetal strip elements 78, 79, 80. The bimetal elements and their special relationship are best shown in FIGURES 14 and 15. One end of the bimetal element is fastened to the bracket 77 by screw 81 which passes through a pair of insulators 82 and 83 which sandwich the element, and threads into the bracket 77. Since under this condition the metal screw 81 would short circuit the element to the bracket an insulating bushing 84 is disposed between the screw 81 and the hole through which it passes in the element. This screw 81 serves to affix and support the bimetal element while zero adjust screw 85 applies a force to the element and thereby causes a lateral displacement of the opposite end adjusting the spacial relationship of the element and another member to be subsequently described. Since this screw 85 need not pass through the bimetal, it is threaded into a mating thread in the bracket 74 and bears directly on insulator 82 which on its opposite side abuts the bimetal element.

Disposed intermediate the ends of the bimetal element 78 is an anticipating heater 86 which comprises an inner electrical insulating core 87 surrounding the bimetal and having a heater winding 88 wound around the core 87 and an outer thermal insulator cover 89. The heater wire is electrically connected at one end to the bimetal and the opposite end passes through and out of the cover for external connection as to be described.

It is now well recognized that the temperature of a space can be controlled much more closely by a thermostat provided with an anticipating heater than by a thermostat providing on-off control that is not so equipped. Modern thermostats of this type are so constructed as to require a definite differential of temperatures to actuate the controlling means between on and off position and thereby obtain positive on and off operation of the heating device. If the thermostat is not equipped with an anticipating heater, the heating device, once their has been a call for heat, will operate to heat up the furnace or boiler before heat will be supplied to the space and will continue to raise the furnace or boiler temperature while the space is being heated to actuate the thermostat through its operating differential. Then when the thermostat is satisfied, unwanted heat will be supplied to the space before the furnace or boiler cools down. This difficulty is largely eliminated when the thermostat is provided with a heater for supplying artificial heat to the thermal element as soon as the heating cycle begins.

An anticipating heater should be so disposed with respect to the thermal element and of proper resistance so that when energized by the available current it will raise the temperature of the thermal element by an amount slightly more than the amount of the aperating differential of the thermostat. The heat supplied by the anticipating thermostat is critical. If too much heat is supplied, the control point of the thermostat will be undesirably reduced during cold weather when continued operation of the furnace or boiler is required since the anticipating heater also will be energized a large portion of the time. Also, in mild weather, excessive heat supplied by the anticipating heater will result in undesirably short operating periods of the furnace or boiler. If too little artificial heat is supplied to the thermal element the advantages of the anticipating heater are lost in that excessive heat will be supplied to the space being heated after the thermostat is satisfied, and the system will "overshoot" in mild weather.

In the usual thermostat the anticipating heater is connected in series with control contacts and the thermostat is connected in series with a source of power and a primary control such as an oil burner relay. There presently exists sufficient information for one skilled in the art to properly match the anticipating heater to the system and to thermally couple the heater to the bimetal.

Mounted on the end of each of the bimetal elements opposite the bracket 77 is a contact structure 90. Affixed to the furthest end point is a generally cylindrical magnet 91 which is provided with a groove or recess in its exposed face 92. The magnet may be electrically insulated from the bimetal as by an insulating adhesive layer 93 or soldered thereto since it would not affect the electric circuit. Rivet 94 secures the contact strip 95 which is of a resilient magnetic material and in turn carries contact tip 96. The end of the strip rides in the groove or recess in the magnet cooperating therewith and differential adjusting screw 97, which is threaded through the bimetal strip by bearing against contact strip, adjusts the spacing between the strip and the magnet. The contact strip, due to its resilient spring-like property (spring steel) is self biasing in a direction toward the magnet. Clearly the bimetal with its contact tip constitutes a movable switch arm and the resilience of the bimetal element is relied upon to cooperate with the magnet to assure that the action of the total switch arm will be positive. Since the contact strip 95 is of a magnetic material it is in reality and acts as an armature for the magnet. Adjustment of adjusting screw 97 serves to determine the operating differential of the switch. As will become clear subsequently, this means, what temperature differential must exist between that which is called for by the thermostat and that which actually exists and is being sensed in order to activate the switch.

Each of the two bimetal elements 78, 79 are so disposed and formed whereby the contact tip 96 abuts one end 98 of a generally S-shaped member 99 as in FIGURE 4. This member on the face opposite that against which the tip 96 bears carries one portion of a pin hinge 100 while a complimentary portion is carried by a plastic shoe 101. The shoe is approximately of a convex configuration with a smooth inner face on which ride the rear ends of the adjusting members 64. It is of a length sufficient to contact only two of the adjusting members at one time and of a material exhibiting a low frictional coefficient, as for example, nylon or Teflon so as to permit relatively free rotation of the entire cam. The support structure for the S-shaped member 99 is best illustrated by reference to both FIGURES 2 and 4 wherein a shaft 102 extends between the cover 26 and plate 19 and is supported therebetween. Extending laterally from the shaft 102 and affixed thereto at some point below the lower cam is an extension 103 which in turn carries an upstanding holder 104. The holder and shaft 102 with its associated structure are parallel and together support the two S members 99 and 110. Disposed coaxially with shaft 102 are a pair of hollow cylinders 104′ and 105 which are free to rotate independently thereabout. The outer cylinder 105 is in reality split into two separate sections; a lower section 106 approximately in horizontal alignment with the lower cam and the upper section 107 aligned with the upper cam. The inner cylinder 104′ extends upwardly through the cover 26 and carries indicator arm 108 and at its lower end is rigidly affixed to the lower cylinder section 106 so as to rotate therewith. The upper section 107 of the outer cylinder likewise extends through and above the cover but not as far out as the inner cylinder so that indicator arm 109 which it carries does not lie in the same horizontal plane as the other indicator arm. Both arms lie above the bushing 75. One S-shaped member is centrally attached to the upper cylinder section 107, while the other S member 110 is likewise attached to the lower section 106. The arrangement permits the rotation of the S-shaped members with their associate cylinders to which they are affixed. Disposed between the free ends of the S-shaped members and the upstanding holder are biasing springs 111 and 112 which urge the members against their respective shoes 101 and 113 by way of hinge 100 and thereby urge the shoe firmly against two of the adjusting members 64. Since the shoe is only of sufficient length to contact two members 64 at any one time, it will effectively average out so as to provide a gradual change between them. The indicator 108 thereby shows the temperature to which the adjusting members contacting shoe 113 have been set and indicator 109 to those contacting shoe 101. By comparing the temperature reading of thermometer 21 with that of the proper indicator, correct operation of the device is readily discernable.

The third bimetal element 80, which is identical to those previously described, as shown in FIGURES 2, 8 and 9, is disposed below the other bimetal elements, is similarly supported by bracket 77 and has its contact tip 114 directly against the metallic cam surface 115 of eccentric manual cam 116. This contact is direct and there is no shoe or other means interposed there between since the cam surface 115 is both nonadjustable and relatively smooth. The cam 116 is mounted for free independent rotation about shaft extension 117 which is coupled to shaft 50 through a bearing journal 118 allowing shaft 50 to be rotated with its cams by the motor while permitting manual cam 116 which is affixed to the outer vertical surface of bearing 118 and spaced from shaft extension 117, to be rotated independently by manual indicator arm 119. The cam 116 itself is provided with a magnetic metallic strip 115 interposed in a annular recess 120 whose flanges 121 and 122 support and align the bimetal element 80 as was the case with the other cams. The manual cam structure may be of any suitable non conducting material with its operating surface covering only a sector portion of the entire cam. The configuration of the operating cam surface is determined in the usual manner so as to provide the selected range of temperature control with no further explanation being necessary.

Also carried by the manual cam 116 and disposed diametrically opposite the strip 115 are two lower manual contact arms 123, 124 and a pair of upper contact arms 125, 126 which extend radially and laterally away from the cam. The contact arms are electrically insulated from the metallic cam surface with the upper arms 125, 126 electrically joined and supported by screw 127 while the lower arms are similarly joined and supported by screw 128. The upper arms have their contact surfaces in the one horizontal plane while the lower arms occupy a horizontal plane spaced therefrom.

Interposed between the contact arms is a stationary strip contact support 129 supported by upstanding bolts 130. The upper surface 131 has imbedded therein a solid metallic generally concentric shorting bar 132 which continuously contacts upper arm 125 and another coaxial concentric shorting bar 133, but of a length shorter than bar 132 and in contact with arm 126. When the cam is rotated in the counter-clockwise direction just short of bolt 130′ which also serves as a stop for manual indicator arm 119, the arm 126 will contact either of three stationary contacts 134–136 designated as automatic (A), Holiday (H) and Weekway (W). Similarly marked, and visible through cover 26, on the upper face of plate 19 are indications 134 which with the pointer 135 of arm 119 show the temperature setting of the manual cam 116. The lower surface of strip support 129 also carries identical aligned contact strips 132′ and 133′. It should be noted that all of the contact strips are electrically independent and are provided with external wiring as are all of the stationary contacts. The cam surface strip 115 extends around the radial end 138 thereof where it is attached by screw 139 which in turn holds a spring grounding element 140 that electrically connects the cam surface strip to the adjustable metallic cams 51 and 52.

Post 141 and a semicircular key receptacle 142 together form a holder and support for adjusting key 67 as shown in FIGURES 10 through 13. The post extends from the cover 26 to the base plate 19 and the receptacle 142 is horizontally aligned with the notches 56 in the cams. As illustrated, this holder structure is disposed near one side of the cover so that with the adjusting key fitted into the receptacle the knurled portion 73 extends beyond the notched periphery of the cam. Horizontally aligned with both the receptacle and the notches is a keylock 143 which carries centrally thereof a notch pin 144 matable with the notches. The key lock is supported by a spring 145 which biases the notch pin into engagement with one of the cam notches (adjusting key removed) thereby locking the cam against rotational displacement as shown in FIGURE 10. When the adjusting key 67 is placed in its receptacle (see FIGURES 11 and 12), the knurled portion 73 is interposed between the key lock and the receptacle so as to bear against the key lock preventing the engagement of the pin 144 and the opposing notch and allowing rotation of the cam. The function of this arrangement is twofold, namely to immobilize the cams when the adjustment is being made with the adjusting key and to insure that the key will and must be properly stored before the device will operate.

*Operation*

Having already described in detail the structural components of the device, it now only remains to discuss the overall operation. Initially the cams 51 and 52 are adjusted by way of adjusting members 64 with key 67 so as to provide the desired temperatures at selected times. As the clock motor rotates, both the star wheel 29 and the adjustable cams 51 and 52, different ones of members 64, will contact the shoes 101 and 113 and adjust the spacial relationship between the S-shaped members and their respective bimetal contact tips, depending on the temperature called for by the setting of the adjusting members. If the temperature called for is higher than the environmental temperature to which the bimetal is exposed, then it will deflect and direct contact will ensue. As further explained hereinafter, the heating system will then supply heat and raise the room or environmental temperature. When the temperature reaches that called for or near thereto (depending on differential setting and anticipating heater) the bimetal will expand somewhat and separate the contact tip from the S member. If the room temperature then decreases (or the next adjusting member which calls for a higher temperature abuts the shoe) the bimetal will contract and contact will be reestablished. The bimetal tip therefore moves toward or away from the S member depending on the environmental temperature, while the S member is urged either away or toward the bimetal depending on the setting of adjusting members 64. Thes two factors establish the separation therebetween which thereby effectively controls the activation of the heating system. The action of a bimetal thermostatic element is well known when referred to a stationary contact or cam for the control of temperature. Here a second factor has been added, namely an adjustable contact or cam. In either case it is clear that the setting of the adjusting members determines and controls the room temperature as does the manual cam when it is in circuit.

Referring now to FIGURE 16, a low voltage source and transformer (not shown) supply power to the clock by way of wires 150 and 151 with one branch thereof, 151, parallelled across S-shaped members 99 and 110 and the strip 115 of the manual cam. This connection may be accomplished by way of the device ground or chassis since all the contacts are effectively grounded. If, however, for other reasons this is not desirable, then the contacts may be appropriately ungrounded and the connection made directly. The setting of the manual cam, as illustrated, is in the Weekday position and the circuit will be traced for this setting. Both the Holiday bimetal 78 and manual bimetal 80 are open-circuited since their contacts on strips 133 and 133' are inactive. Assuming that the room temperature is below the temperature demanded by the active members 64 of the Weekday cam, then the contact tip of the bimetal 79 will be in intimate contact with 110 and the series circuit path will include bimetal 79, lead 152, contact 134, switch arms 126, 125, strip 132 and lie 153 thereby shorting or closing a contact between lines 151 and 153. Coincidental with this above circuit is the associated anticipating heater circuit which also includes line 151, contact 110, the bimetal tip and the anticipating heater 154, line 155, contact 134', switch arms 124, 123, strip 132' and line 156. This closing of the bimetal contact effectively places the heater across the power lines 150–151 thereby supplying energy to the heater 154 only when the thermostat calls for activation of the main heater plant. The same general circuit configuration exists when the manual cam is set for the Holiday (H) position. In thes two positions, the thermostat will operate semi-automatically in that the temperature variation or cycle will be repeated every 24 hours until the manual cam position is altered.

With the cam set to the manual (M) position, the operable contact, strip 115 and the bimetal 80 are ineffective placed across lines 151–153 through line 157, strip 133, switch arms 125, 126, while the heater 158 is placed across supply lines 150–151 by strip 115, the tip of bimetal 80, line 159, strip 133', switch arms 123, 124, and line 156. Since the manual cam may be positioned over the entire ranges of strips 133, 133' and still maintain the above circuit path, it is clear that for these positions, the strip cam surface 115 varies its spacing from the bimetal element and thereby establishes the environmental room temperature which remains fixed.

With the cam switch set for fully automatic (A) operation and the star gear 29 at an angle such that the cam 32 through follower arm 39 has set switch 36 for a weekday, namely with movable contacts 45 and 45' contacting stationary contacts 48 and 48' respectively the circuit path will be traced. Starting with line 151 this path includes therein member 110, the tip of bimetal 79, line 152, line 160, contact 48, movable contact 45, line 161, contact 136, switch arms 125, 126, strip 132 and line 153 so as to put the operating contacts across lines 151–153. The heater 154 path includes contacts 45' and 48' and strip 132'. It should be noted that both the heater and main circuit are similar except the primed reference numerals apply to the heater circuit. When the cam 32 is in the Weekend or Holiday position, the follower arm 39 is depressed and rides in the cutout 34 so as to cause movable contacts 45, 45' to engage stationary contacts 47, 47' of switch 36. With this switch position the Weekday element 79 is removed from the circuit and the Holiday bimetal 78 and its associated cam substituted therefor. In the fully automatic position one cam system is substituted for the other depending on the particular day of the week so as to control the temperature. The thermostat of this invention thus either connects lines 151 and 153 when the temperature is to be elevated or open circuits these lines when the temperature is correct. When lines 151 and 153 are short circuited current flows through the relay coil 162 which controls the contacts (not shown) supplying power to the main heater. The thermostat of this invention therefore has three simple modes of operation. A manual mode in which a temperature is selected by turning cam handle 119 as indicated and the device will maintain this environmental temperature. An automatic weekday mode which will vary the hourly temperatures in accordance with the peripheral adjustment of cam 52 for one daily cycle. The programming of cam 52 is made with regard to the weekday hourly temperature requirements while for the automatic Holiday or Weekend mode the programming of cam 51 follows other requirements. The fully automatic mode chronologically combines these two modes so that for the five weekdays, cam 52 is controlling and for the remaining two weekend days cam 51 controls. Where a holiday falls on a weekday, it is a simple matter to throw the manual cam to the Holiday or Weekend mode. The described thermostatic device is not only simple but affords extensive flexibility of operation.

Although I have only set forth one exemplary embodiment of my invention, it is to be understood that modifications may be made thereon without departing from the broader spirit and scope of the present invention, as set forth in the following claims.

I claim:

1. An adjustable temperature controlling device comprising
   a base which carries,
   an electrically energized clockmotor
   a rotary cam element carried by said base and having a plurality of spaced, inwardly extending radial slots and a plurality of axially directed spaced slots, each of said radial slots partially intersecting one of said axial slots,
   peripherally adjustable slug members carried in and by said radial slots and movable therein
   adjusting means insertable in each of said axial slots for positioning each of said slugs in said radial slots
   coupling means disposed between said motor and said cam element and coupled to each for rotation of the latter by the former
   a temperature responsive follower element having one end carried by said base and the free end thereof proximate said slugs and movable toward and away from said slugs under the influence of the temperature of said follower element,
   a dielectric arcuate shoe member pivotally supported by said base adjacent the peripheral surface of said cam for movement about an axis parallel to the axis of said cam
   metallic spring means carried by said base urging said shoe member into contact with the exposed ends of a plurality of said slugs and a portion of said metallic means interposed between said shoe and said free end of said follower element
   utilization means including an electric environmental temperature controller in circuit with said follower and said metallic means for activation and deactivation of said controller,
   whereby the spacing between said free end of said follower and said metallic means is determinative of the temperature at which contact therebetween will be made and thereby cause activation of said controller.

2. The device, according to claim 1, wherein said cam further includes flanges radially extending from the upper and lower surfaces thereof for guiding said shoe and said free end of said follower element.

3. The device, according to claim 2, wherein said flanges are provided with axial notches and further including
   a keylock member having a portion thereof engagable with said notches
   means urging said portion of said keylock member into engagement with said notches thereby preventing rotation of said cam
   receptacle for supporting said adjusting means intermediate said keylock member and said cam whereby when said adjusting means is in said receptacle said cam is free to rotate and when said adjusting means is removed said cam is prevented from rotating.

4. The device, according to claim 3, wherein said coupling means includes a clutch for independent unidirectional rotation of said cam.

5. The device, according to claim 2, wherein said coupling means includes
   a shaft supported by said base and rotatable by said motor
   a coupling gear carried by said shaft and free to rotate thereabout,
   a wraparound coil spring wound around said shaft having one end thereof affixed to said shaft and the opposite end free thereof, a portion of said spring intermediate its ends coupled to said coupling gear whereby said gear maybe freely rotated in one direction and said spring will unwind and rotation in the other direction prevented by said spring.

6. The device, according to claim 1, wherein said metallic means further includes an indicator displacable in accordance with the positioning of said slugs in contact with said shoe whereby said indicator will indicate the activation temperature to which said slugs have been positioned.

7. An automatic adjustable temperature controlling device comprising:
   a base which carries,
   an electrically energized clockmotor,
   a cam shaft also carried by said base and having mounted thereon for rotation therewith,
   a pair of vertically stacked peripherally adjustable disk cam elements,
   a coupling gear train disposed intermediate said cam shaft and said motor and coupled to each for rotation of said cam shaft by said motor,
   a pair of temperature responsive bimetal members each supported by said base and each having its operative end proximate the periphery of one of said cam elements for movement toward and away therefrom under the influence of the environmental temperature of said bimetal member,
   contact means carried by said cam and said operative end of said bimetal member for providing electrical contact therebetween by the movement of said bimetal member,
   switch means coupled to and activated by the rotational displacement of said gear train for selecting which pair of members and elements will be in circuit with said contact means,
   whereby the environmental temperature of said bimetal members may be altered in accordance with the peripheral adjustment of said elements and then periodically by the other of said elements by a temperature altering system in electrical connection with said contact means.

8. The device, according to claim 7, wherein said switch means includes
   a peripheral day cam carried by said base and having a portion of its periphery recessed
   a snap action switch having an extending cam follower arm actuator, said arm in contact with the periphery of said day cam whereby said switch will assume either of two positions dependent on which portion of said periphery said arm is in contact,
   means rotationally coupling and intermediate said day cam and said gear train.

9. The device, according to claim 8, wherein said cam shaft is rotated at a rate of one complete revolution per day by said clockmotor
   said day cam is rotated at one complete revolution per week and said recessed portion is approximately two-sevenths of the entire periphery of said day cam.

10. The device, according to claim 9, further including,
    a fixed peripheral manual cam disposed vertically on said cam shaft,
    a third temperature responsive bimetal member supported by said base and having its operative end proximate the periphery of said manual cam element for movement toward and away therefrom under the influence of the environmental temperature of said third bimetal member,
    third contact means carried by said manual cam and said operative end of said third bimetal member for providing electrical contact therebetween by the movement of said third bimetal member,
    a manual switch electrically connected to said snap action switch and said contacts of said third bimetal member and said cam for selecting individually in circuit any of said stacked cam elements and said manual cam,
    whereby said manual switch overrides and selectively permits weekly, weekday, weekend and manual operation.

References Cited
UNITED STATES PATENTS
2,333,319 11/1943 Kucere _____ 200—136.5
2,419,077 L4/1947 Isserstedt _____ 200—122

BERNARD A. GILHEANY, *Primary Examiner.*

H. LEWITTER, R. COHRS, *Assistant Examiners.*